United States Patent [19]
Stroud et al.

[11] Patent Number: 5,738,410
[45] Date of Patent: Apr. 14, 1998

[54] COLLAPSIBLE THREE WHEELED STROLLER WITH ADJUSTABLE BACKREST

[75] Inventors: David J. Stroud, Dayton; Cheri Wagner, Covington, both of Ohio

[73] Assignee: Lisco, Inc., Tampa, Fla.

[21] Appl. No.: 736,745

[22] Filed: Oct. 25, 1996

[51] Int. Cl.⁶ .................................................. B60N 2/02
[52] U.S. Cl. ................................ 297/354.12; 297/380
[58] Field of Search ...................... 297/354.12, 354.13, 297/377, 380, 382, 25, 34

[56] References Cited

U.S. PATENT DOCUMENTS 3,746,392  7/1973  German ................................ 297/380
5,445,433  8/1995  Avihad ................................. 297/380
5,490,685  2/1996  Kitayama ...................... 297/354.12 X
5,516,193  5/1996  Simpson ......................... 297/380 X

*Primary Examiner*—Laurie K. Cranmer

[57] ABSTRACT

The present invention relates to a three wheeled stroller which is adapted for use in transporting an infant. The stroller includes a collapsible frame structure and a seat which is adapted to be secured thereto. This frame structure is both laterally collapsible and foldable to facilitate the storage and transportation of the stroller. Both the collapsing and the folding can be initiated by way of an upper lock assembly positioned adjacent the handles of the frame. A series of straps are also included for the purpose of adjusting the seat back of the stroller.

2 Claims, 4 Drawing Sheets

COLLAPSIBLE THREE WHEELED STROLLER WITH ADJUSTABLE BACKREST

BACKGROUND OF THE INVENTION

1. Field of the Invention

The present invention relates to a stroller and, more particularly, to such a stroller which includes an improved backrest adjustment means.

2. Description of the Prior Art

The use of strollers is known in the prior art. Furthermore, the use of foldable wheeled strollers is also known in the prior art. These folding arrangements contemplate folding one or more frame components relative to one another. All such folding arrangements enable the stroller to be more readily stored and transported. Furthermore, there are various stroller arrangement in the prior art which contemplate the positioning of a backrest.

None of the prior art strollers utilize a series of straps with means to adjust the overall length to thereby selectively adjust the flexible backrest of a stroller.

The literature discloses various stroller arrangements. Note U.S. Pat. No. 5,468,009 to Eyman et al.; U.S. Pat. No. 5,356,171 to Schmidlin et al.; and U.S. Pat. No. 5,364,119 to Leu each of which disclose folding three wheeled strollers or stroller frames. Additionally, U.S. Pat. No. 5,076,599 to Lockett et al.; U.S. Pat. No. 5,029,891 to Jacobs; U.S. Pat. No. 4,953,880 to Sudakoff et al.; U.S. Pat. No. 4,934,728 to Chen and U.S. Design Pat. No. 364,131 Eichhorn et al. all disclose various three wheeled stroller arrangements.

However, none of these strollers is laterally collapsible. Furthermore, none of the prior art strollers disclose a series of adjustable straps for the purpose of adjusting a flexible backrest.

The present invention achieves its intended purposes, objects and advantages over the prior art through a new, useful and unobvious combination of components elements, through the use of a minimum number of functioning parts, at a reasonable cost to manufacture, and through the utilization of only readily available and conventional materials.

Thus, the present invention relates to a new and improved stroller seat with easy adjustment capabilities. The seat comprises a generally horizontal seat component secured to the stroller; and a flexible back component having a lower end positioned adjacent to the seat component and having an upper component. The adjustment means takes the form of a series of three interconnected straps positioned behind the flexible back, means for use in selectively increasing and decreasing the overall length of the straps to thereby recline and retract the flexible back accordingly.

Therefore, it is an object of this invention to provide a three wheeled stroller which overcomes the inadequacies of the prior art devices and which constitutes an improvement which is a significant contribution to the advancement of the art.

Another object of the invention to enable the backrest of a three wheel stroller to be more readily adjustable.

It is a further object of the present invention to provide a means to quickly and conveniently adjust the backrest of a stroller to any one of a number of different orientations without any pinch points that are found in mechanical recline devices.

It is another object of the present invention to provide a stroller which may be easily and efficiently manufactured and marketed.

It is further object of the present invention to provide a stroller construction which is of a durable and reliable construction.

The foregoing has outlined some of the more pertinent objects of the present invention. These objects should be construed to be merely illustrative of some of the more prominent features and applications of the intended invention. Many other beneficial results could be obtained by applying the disclosed invention in a different manner or modifying the invention within the scope of the disclosure. Accordingly, Other objects and a fuller understanding of the invention may be had by referring to the summary of the invention and the detailed description of the preferred embodiment in addition to the scope of the invention as defined by the claims taken in conjunction with the accompanying drawings.

SUMMARY OF THE INVENTION

The invention is defined by the appended claims with the specific embodiment shown on the attached drawings. For the purposes of summarizing the invention, the invention essentially comprises a collapsible three wheeled stroller for use in transporting an infant.

Therefore, the present invention relates to a new and improved stroller seat with easy adjustment capabilities. Specifically, the present invention includes a frame portion having a horizontal component, a generally upwardly extending component, and a lower frame components. The present invention further includes a generally horizontal seat component secured to the horizontal component of the frame. Additionally, a flexible back component having a lower end positioned adjacent to the seat component and lower frame component and having an upper component located between the lateral extents of the upper frame component is included. The adjustment means incorporates a flexible strap secured to each upper frame component, each flexible strap having a distal end, a buckle slidably secured to each strap such that each buckle has a first orientation proximate to the upper frame component and a second orientation remote from the upper frame component; a central strap having two free ends, each of the free ends secured to a buckle, whereby the central strap can be employed to slidably position the buckles remote from the upper frame component and thereby recline the flexible back, and the distal ends of each flexible strap can be utilized to locate the buckles proximate to the upper frame component to thereby bring the flexible back to an upright orientation.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. Its should be appreciated by those skilled in the art that the conception and the disclosed specific embodiment may be readily utilized as a basis for modifying or designing other structures for carrying out the same purposes of the present invention. It should also be realized by those skilled in the art that such equivalent methods and structures do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which.

The same reference numerals refer to the same parts through the various Figures.

DESCRIPTION OF THE PREFERRED EMBODIMENT

The present invention relates to a collapsible stroller 10 for use in transporting an infant. In its broadest context, the present invention includes a frame structure to which a seat is adapted to be secured. This frame structure is both laterally collapsible and foldable. Both the collapsing and the folding can be initiated by way of an upper lock assembly positioned adjacent the handles of the frame. The various components of the present invention, and the manner in which they interrelate, will be described in greater detail hereinafter.

The frame structure includes a first and second side frame, each of identical construction. Each side frame includes an upper extent, a lower extent and an intermediate portion therebetween. The upper extent of each side frame takes the form of a curved handle. These handles, as with other components of the frame, can be covered in a resilient foam padding. Each side frame also includes a curved seating frame element adjacent its lower extent. Furthermore, each side frame incorporates a pivot assembly between its upper and lower extents. More specifically, the first side frame includes a first pivot assembly and the second side frame includes a second pivot assembly. Each of the pivot assemblies has a first, engaged, orientation which prevents the pivotal movement between the upper and lower extents of the side frame. Alternatively, each pivot assembly has a second, disengaged, orientation which permits the pivotal movement between the upper and lower extents of the side frame. These pivot assemblies will be described in greater detail hereinafter. In order to facilitate the complete collapsing of the stroller, the two side frames are pivotally interconnected at their lower extents. The manner in which the entire frame structure collapses will be described in greater detail hereinafter.

Figure 1:
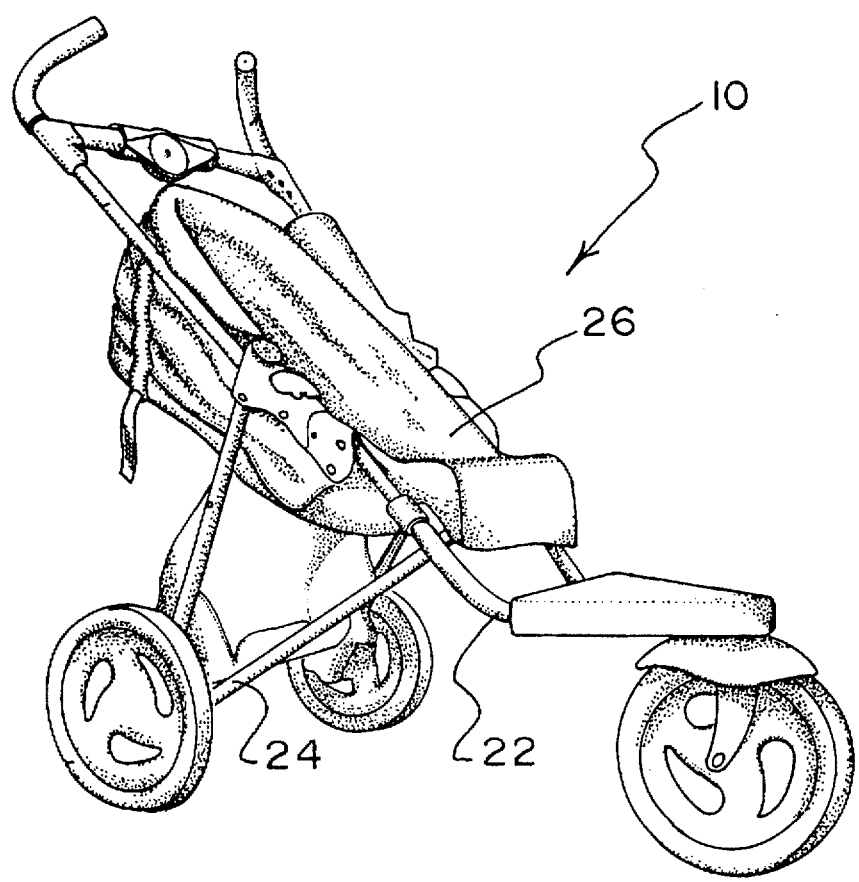
FIG. 1 is a perspective view of the preferred embodiment of the three wheeled stroller constructed in accordance with the principles of the present invention.
Figure 2:
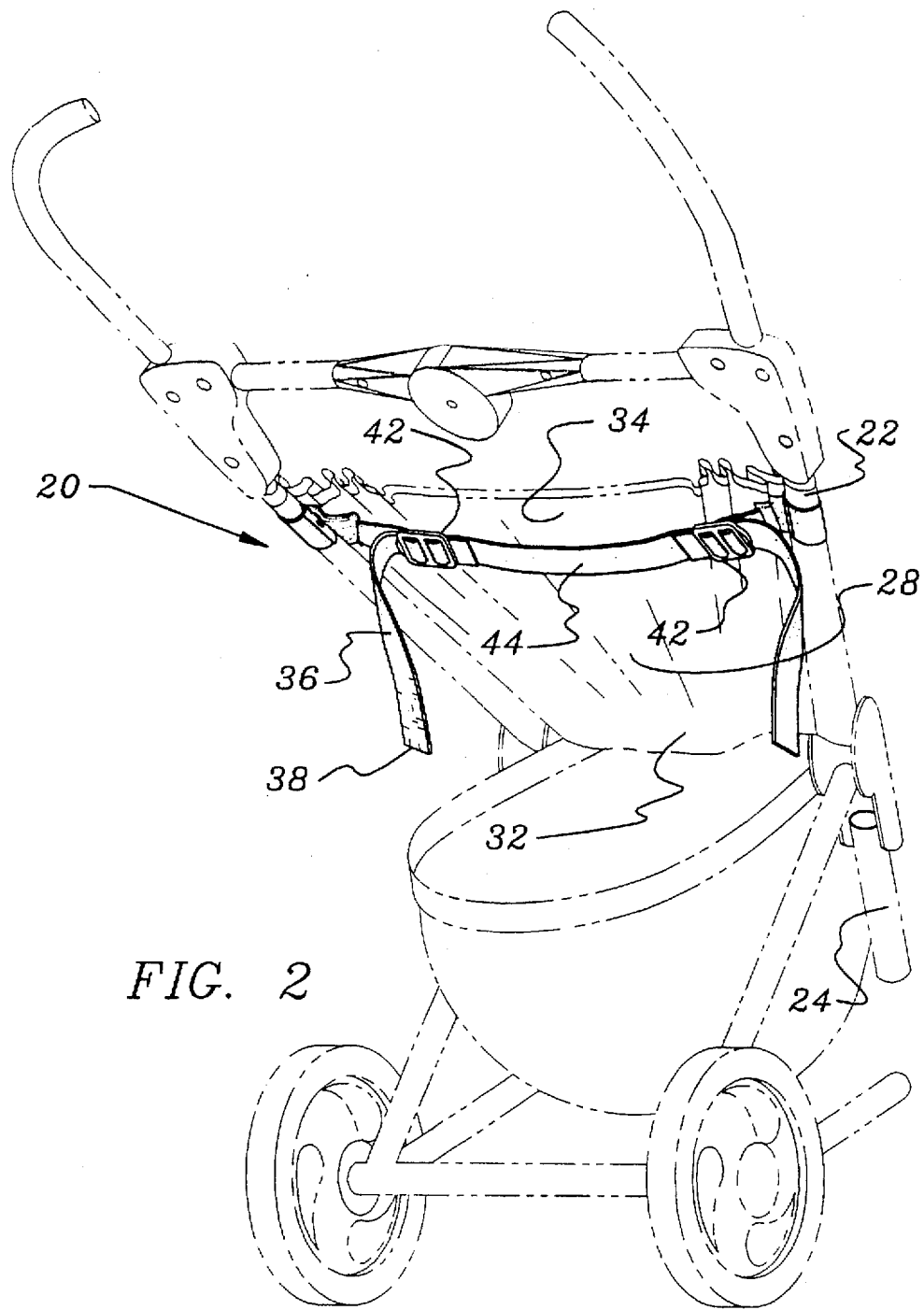
FIG. 2 is a perspective view of the adjustable reclining means of the present invention.
Figure 3:
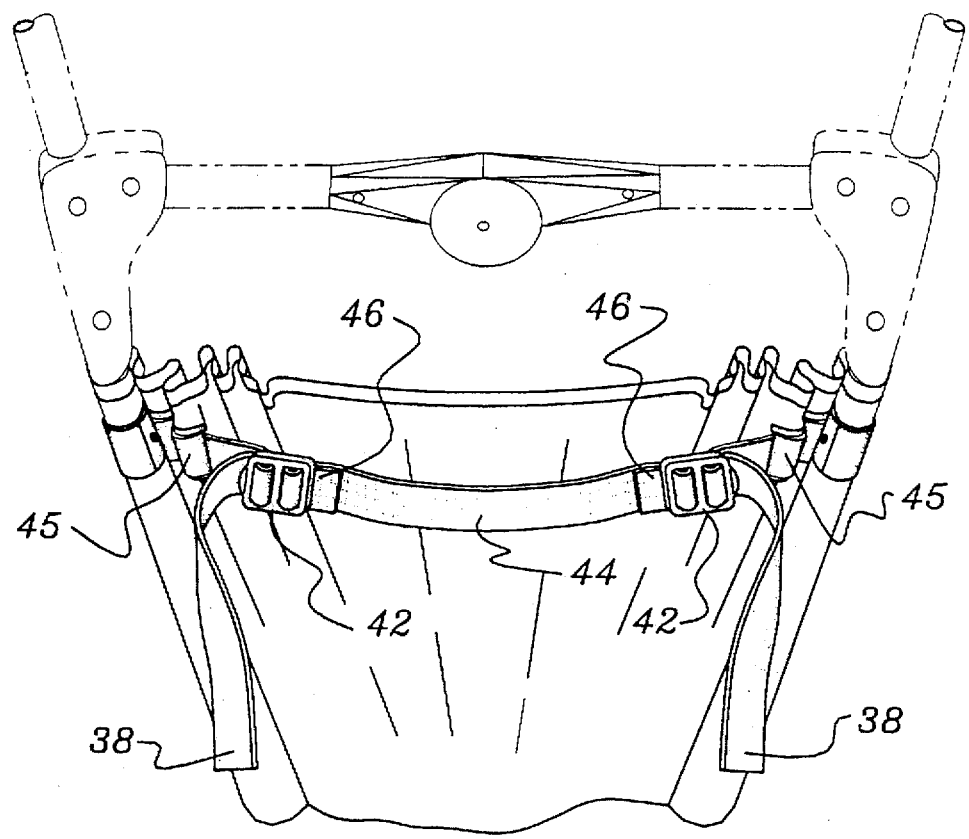
FIG. 3 is a perspective view of the adjustable reclining means of the present invention in the retracted or upright orientation.
Figure 4:
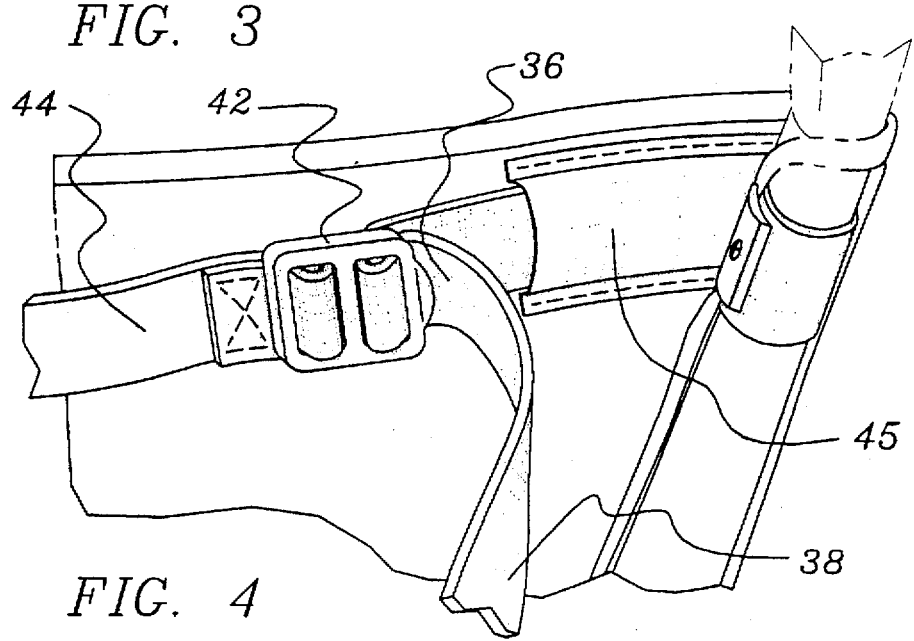
FIG. 4 is a detailed view of one of the buckles employed in conjunction with the present invention.
Figure 5:
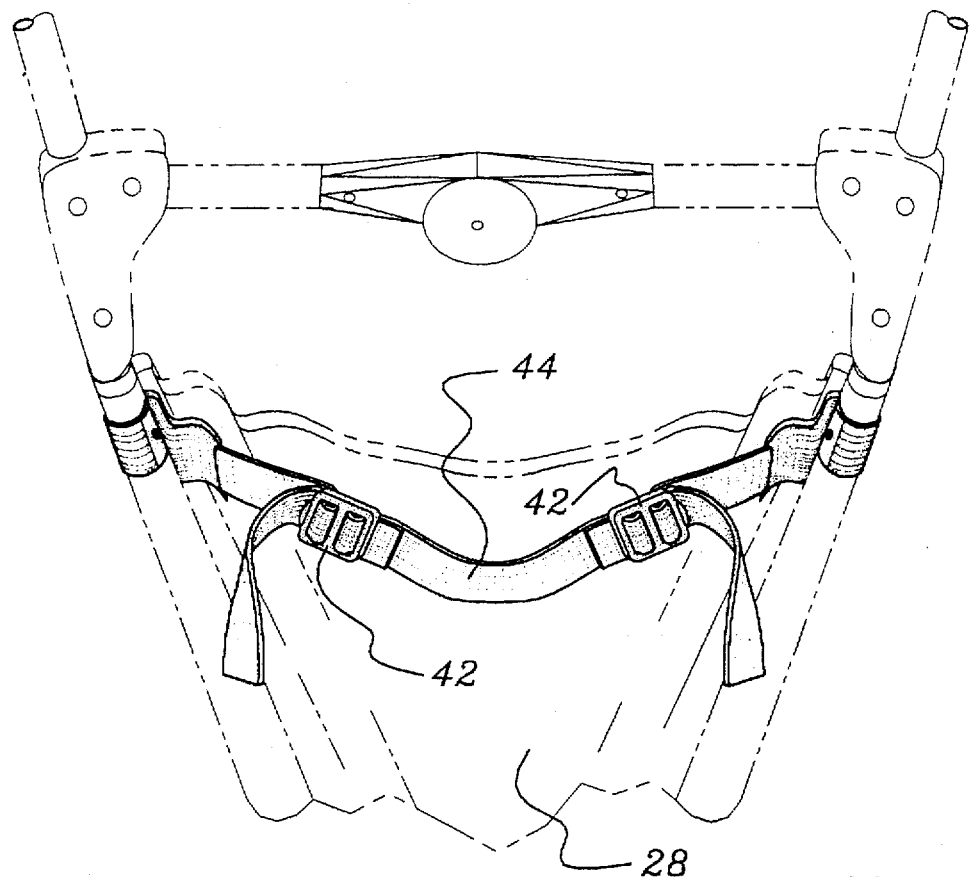
FIG. 5 is a perspective view of the adjustable reclining means of the present invention in the reclined orientation.
Figure 6:
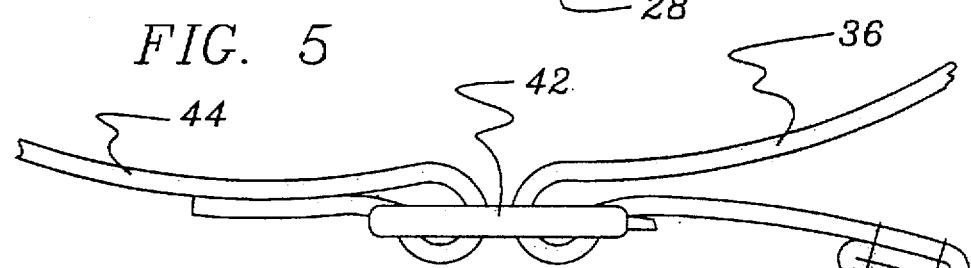
FIG. 6 is a top view of one of the buckles employed in conjunction with the present invention.
Figure 7:
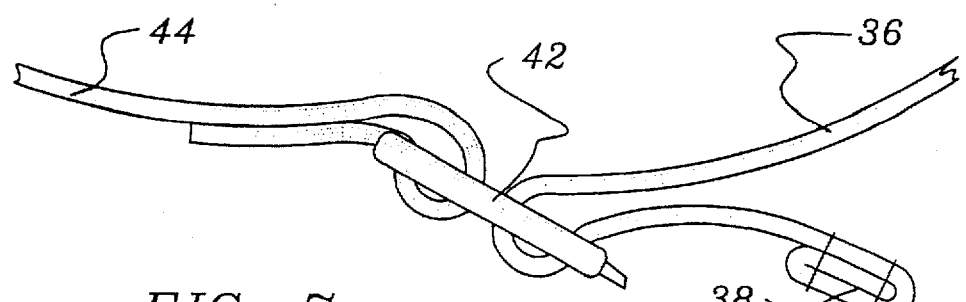
FIG. 7 is a top view of one of the buckles employed in conjunction with the present invention.

A first and second side rearward frame constitute two more elements of the overall frame structure. The first side rearward frame has one of its ends interconnected with the intermediate portion of the first side frame. More specifically, this end is secured to the pivot assembly of the first side. The relationship between the first side rearward frame and the first side pivot assembly can most clearly be seen with reference to FIG. 3. This first side rearward frame also has a distal end. In a similar fashion, the second side rearward frame has one of its ends interconnected with the intermediate portion of the second side frame. More specifically, this end is secured to the pivot assembly of the second side. This second side rearward frame also has a distal end.

Lateral stability is provided to the frame structure in three ways: a pair of cross braces; an upper pair of lateral braces; and a lower pair of lateral braces. The upper pair of lateral braces will next be described. The upper pair of lateral braces includes a first upper lateral brace pivotally secured to the upper extent of the first side frame, and a second upper lateral brace pivotally secured to the upper extent of the second side frame. These two lateral braces are pivotally interconnected by way of an upper lateral lock assembly. The details regarding this lateral lock assembly will be described in greater detail hereinafter.

The front wheel assembly of the stroller 10 is interconnected to the lower extents of both the first and second side frames. In the preferred embodiment, means are included to enable the front wheel to swivel about a vertical axis. Such an arrangement enables the stroller to be easily maneuvered. Additionally, means are included to enable, at the user's discretion, the front wheel to be locked in a desired orientation relative to the vertical axis.

The stroller 10 also employs a first and second rear wheel assemblies. More specifically, a first side rear wheel assembly is secured to the distal end of the first rearward frame. In a similar fashion, a second side rear wheel assembly is secured to the distal end of the second rearward frame. To provide additional rigidity, the first side rear wheel assembly is also secured to the distal end of a first cross brace. Likewise, the second side rear wheel assembly is secured to the distal end of a second cross brace. The cross braces and will be described in greater detail hereinafter.

As indicated hereinabove, a pair of lower lateral braces provides a degree of lateral stability to the entire frame structure. The pair includes a first lower lateral brace pivotally secured to the first side rear wheel assemblies, and a second lower lateral brace pivotally secured to the second side rear wheel assemblies. A lower lateral lock assembly serves to pivotally interconnect the first and second lower lateral brace.

As indicated hereinabove, a pair of cross braces provide another degree of lateral rigidity to the frame structure. The pair includes a first cross brace having an end interconnected to the lower extent of the second side frame and a distal end connected to the first rear wheel assembly. Likewise, a second cross brace has an end interconnected the lower extent of the first side frame and a distal end connected to the second rear wheel assembly. For each side, a clevis is employed in interconnecting the cross brace to the lower extent of the side frame. Specifically, a first clevis is employed in interconnecting the first cross brace to the lower extent of the second side frame; and a second clevis is employed in interconnecting the second cross brace to the lower extent of the first cross brace. Each clevis permits it corresponding cross brace to both pivot and rotate relative to the lower extent of the side frame.

Turning now to the lateral lock assemblies, the upper lateral lock assembly includes a first hinge component and a second hinge component pivotally disposed between the first and second upper lateral braces. The lateral lock assemblies, per se, are generally described in co-pending application Ser. No. 08/736,743, attorney docket number P-4741, entitled Collapsible Three Wheel Stroller With Improved Hinge, filed concurrently herewith, the subject matter of which is incorporated herein by reference.

The lower lateral lock assembly includes a collar which is employed in bringing the lower lateral lock assembly into its disengaged orientation. The disengaged orientation of the lower lateral lock assembly permits the relative pivotal movement of the lower lateral braces.

The first and second pivot assemblies will next be described. The two pivot assemblies are identical in construction, consequently, only one such assembly will be described in detail. The side frame intermediate pivot assembly includes a housing component and a receptacle component. Additionally, a plunger is slidably positioned within the housing component. This plunger is spring biased such as to normally extend into the receptacle component and thereby prevent the pivotal movement between the upper and lower extents of the side frame. Thus, the pivot assemblies have a first, engaged, orientation wherein the plunger is positioned within the receptacle component; and a second, disengaged, orientation wherein the plunger is removed from the housing component.

The pivot assemblies are only in their disengaged orientations after the upper pair of lateral braces have pivoted relative to one another. In other words, the pivoting of the upper and lower extents of the side frames occurs only after upper lateral lock assembly permits the pivoting of the upper pair of lateral braces. This arrangement is achieved via first and second plunger linkages. Although linkage is described in accordance with the present invention other structures would suffice such as a semi rigid cord or wire. A first plunger linkage serves to interconnect the first upper lateral brace and the plunger of the first side intermediate pivot assembly. This first plunger linkage functions such that pivotal movement of the first upper lateral brace brings the first pivot assembly into its disengaged orientation. Thus, pivotal movement between the upper and lower extents of the first side frame is permitted.

In a similar fashion, a second plunger linkage interconnects the second upper lateral brace and the plunger of the second side intermediate pivot assembly. This second plunger linkage functions such that pivotal movement of the second upper lateral brace brings the second pivot assembly into its disengaged orientation. Thus, pivotal movement between the upper and lower extents of the second side frame is permitted.

Therefore, the operating orientation of the frame is achieved when the upper lateral, lower lateral, and two side pivot assemblies are in their engaged orientations. When a user wishes to collapse the stroller the following steps must be taken. First, bring the upper lateral lock assembly into its disengaged orientation. Next, the upper lateral lock assembly is pushed inwardly to effect the pivoting of the two upper lateral braces with respect to the first and second side frames. The collar of the lower lateral lock assembly must also be disengaged to bring the lower lateral lock into its disengaged orientation. As the upper lateral braces are pivoted the upper lateral lock moves downwardly. Also, as the lower lateral braces are pivoted the lower lateral lock moves upwardly. The pivotal motion of the upper lateral braces provides tension within the length of the two plunger linkages. This tension within the plunger linkages brings the two pivot assemblies into their disengaged states. Next, the upper extents of the side frames are pivoted toward the lower extents of the side frames. The stroller is now in its collapsed configuration.

The collapsible and foldable frame does not in anyway interfere with the seating material that is adapted to be positioned upon the frame. The seating material has its two sides removably secured to the two side frames of the frame structure. Furthermore, the lower extent of the seating material is removably secured over each curved seating frame element. The seating portion of the stroller is created by positioning of the seating material over these curved seating frame elements.

The three wheeled stroller also includes a new and improved means to provide easy adjustment of the flexible backrest. In its broadest context the adjustment means takes the form of a series of three interconnected straps positioned behind the flexible back. Additionally, means are included for selectively increasing or decreasing the overall length of the straps to thereby recline and retract the flexible back accordingly. Details of the various components of the present invention, and the manner in which they interrelate, will be described in greater detail hereinafter.

The adjustment means finds particular application to a stroller 10 having a frame portion having a horizontal component, a generally upwardly extending component 22, and a lower frame component 24. Furthermore, the stroller seat includes a generally horizontal seat component 26 secured to the horizontal component of the frame. Additionally, the seat includes a flexible back component 28 having a lower end 32 positioned adjacent to the seat component and the lower frame component 24. This flexible back 28 has an upper component 34 located between the lateral extents of the upper frame component 22.

The adjustment means includes a pair of flexible straps 36. Specifically, a flexible strap secured to each upper frame component 22. Each flexible strap has a distal end 38, and a buckle 42 slidably secured upon its length. Thus, each buckle 42 has a first orientation proximate to the upper frame component 22 and a second orientation remote from the upper frame component 22. The adjustment means also includes a central strap 44 having two free ends 46. Each of the free ends 46 is secured to a corresponding buckle 42. Thus, the central strap 44 can be employed to slidably position the buckles 42 remote from the upper frame component 22 and thereby recline the flexible back 28. Alternatively, the distal ends 38 of each flexible strap 36 can be utilized to locate the buckles 42 proximate to the upper frame component 22 to thereby bring the flexible back 28 to an upright orientation.

Thus, the reclining mechanism employs a central strap having a buckle secured to each of its ends. Each of these buckles is also slidably secured to a flexible strap. Each of these flexible straps has an end secured to the upper portion of the frame. Thus, pulling outwardly upon the central strap slides each of the buckles outwardly upon each of the two flexible straps. This movement brings the flexible seat back to it reclined orientation. Alternatively, the distal ends of the two flexible straps can be pulled to move each buckle to a position proximate to the upper frame components of the stroller. This movement brings the flexible seat back to its upright orientation.

As to the manner of usage and operation of the present invention, the same should be apparent from the above description. Accordingly, no further discussion relating to the manner of usage and operation will be provided. Note, however, that the stroller per se is generally described in co-pending application Ser. No. 08/736,743, attorney docket number P-4741, entitled Collapsible Three Wheeled Stroller, filed concurrently herewith, the subject matter of which is incorporated herein by reference.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved stroller seat with easy adjustment capabilities comprising:
    a frame portion having a horizontal component, a generally upwardly extending component, and a lower frame component;
    a generally horizontal seat component secured to the horizontal component of the frame;
    a back component made from a uniformly flexible material having a lower end positioned adjacent to the seat component and lower frame component and having an upper component located between the lateral extents of the upper frame component; and
    a flexible strap secured to each upper frame component, each flexible strap having a distal end, a buckle slidably secured to each strap such that each buckle has a first orientation proximate to the upper frame component and a second orientation remote from the upper frame component, a central strap having two free ends, each of the free ends secured to a buckle, the central strap being interconnected to the stroller seat only by way of the buckles, whereby the central strap can be pulled to slidably position the buckles remote from the upper frame component and thereby recline the flexible back at a variety of angles, and the distal ends of each flexible strap can be utilized to locate the buckles proximate to the upper frame component to thereby bring the flexible back to an upright orientation.

2. A new and improved three wheeled stroller seat with easy adjustment capabilities comprising:
    a generally horizontal seat component secured to the stroller;
    a back component formed from a uniformly flexible material having a lower end positioned, adjacent to the seat component and having an upper component;
    a series of three interconnected straps positioned behind the flexible back, means for use in selectively increasing and decreasing the overall length of the straps to thereby recline and retract the flexible back accordingly at a variety of different angles
    two of the three straps each being interconnected to an upper frame component;
    a central strap having two free ends and an intermediate extent therebetween, the two free ends of the central strap being interconnected to the other two straps, the intermediate extent of the central strap being completely free of the back component.

* * * * *